2 Sheets--Sheet 1.

J. HINZEY.

Smut-Mills.

No. 5,861.

Reissued May 5, 1874

Witnesses:

A. P. Lacey

J. Mason Hosfer

Inventor.

John Hinzey.

per G. B. Fowles Attorney.

AM. PHOTO-LITHOGRAPHIC Co. N. Y. (OSBORNE'S PROCESS.)

2 Sheets--Sheet 2.

J. HINZEY.
Smut-Mills.

No. 5,861. Reissued May 5, 1874.

Witnesses.

A. P. Lacey

J. Mason Boyler

Inventor.

John Hinzey per G. B. Fowler, Attorney

AM. PHOTO-LITHOGRAPHIC CO. N. Y. (OSBORNE'S PROCESS.)

UNITED STATES PATENT OFFICE.

JOHN HINZEY, OF PEORIA, ILLINOIS, ASSIGNOR TO NICOL, BURR & CO.

IMPROVEMENT IN SMUT-MILLS.

Specification forming part of Letters Patent No. 142,465, dated September 2, 1873; reissue No. 5,861, dated May 5, 1874; application filed April 24, 1874.

*To all whom it may concern:*

Be it known that I, JOHN HINZEY, of the city of Peoria, in the county of Peoria and State of Illinois, have invented certain new and useful Improvements in Smut-Mills; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 2:
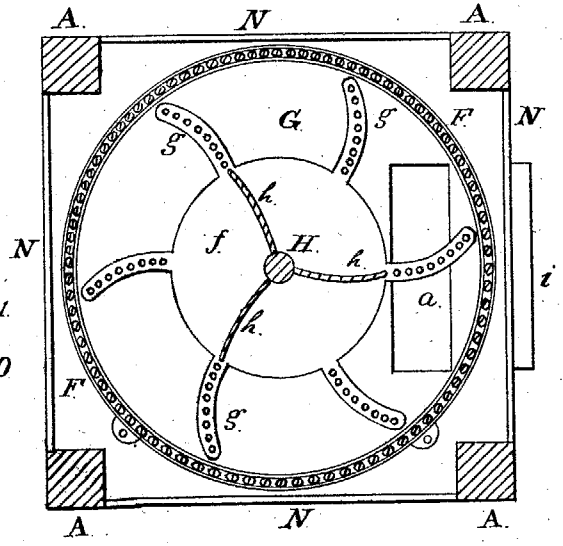
Figure 1:
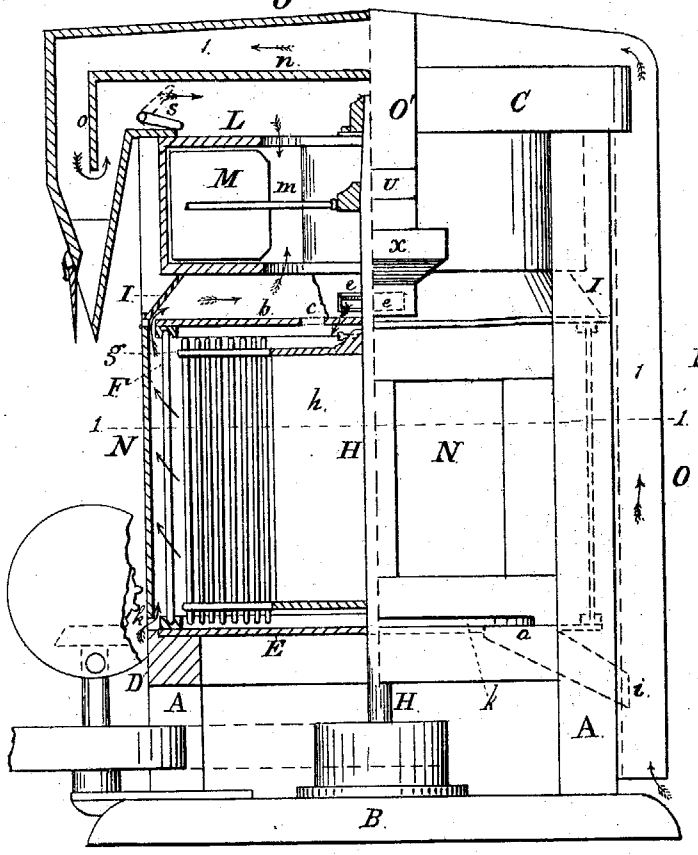
Figure 3:
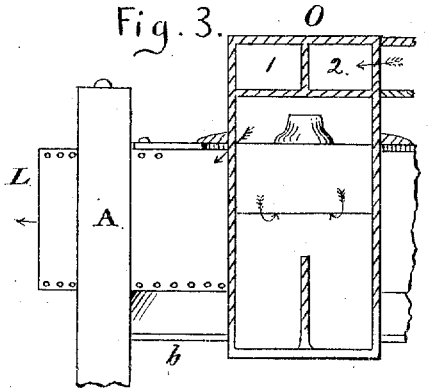
Figure 4:
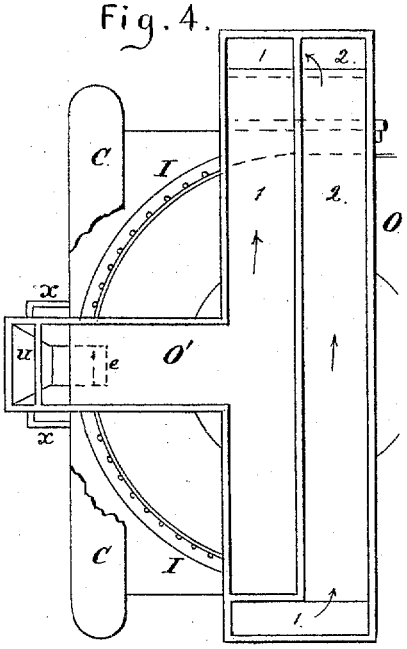
Figure 5:
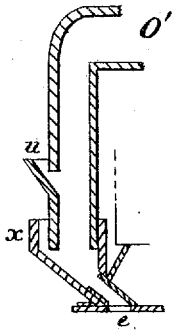
Figure 6:
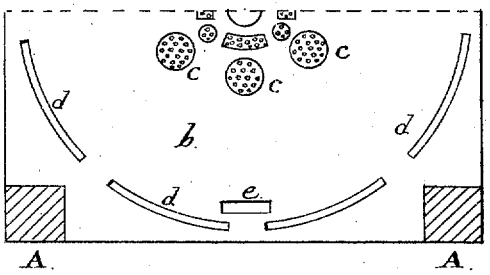

Figure 1 represents an exterior elevation of one-half of the machine and a general sectional elevation of the other half; Fig. 2, a horizontal section as indicated by the dotted lines 1 1 of Fig. 1; Fig. 3, a vertical section of the pendent part of the air-suction spout; Fig. 4, a plan view of suction-spout, the top board or roof being removed, showing its position on the fan-box; Fig. 5, a vertical section of suction-spout and grain-hopper, having an air-draft around it; Fig. 6, a plan view of the top plate of the cleaning-cylinder.

Like letters in all the figures of the drawing indicate like parts.

This invention relates to the revolving beater of a smut-mill, having head-plates provided with curved arms and rods or bars attached thereto in a curved line, in combination with a cleaning-cylinder inclosing the same, so that the rods of the beater will act upon the grain in such a manner as to effectively rub off the smut; also, to a combination of fans with the heads of the revolving beater of a smut-mill for blowing the smut out of the cylinder, and sweeping the grain into the suction-spout, as will be hereinafter more fully explained.

The frame-work of the machine consists of four posts, A, two of which are attached to a sill, B, on each side, and braced at the top by the cross-bar C, and below, at a suitable distance above the sill, by the cross-bar D. E is a plate resting upon the cross-bars D, and forming the bottom inclosure of the cylinder, which latter is confined in place thereupon by pins or other stops projecting from the said plate. An opening, *a*, is constructed in the plate, which connects with the suction-spout on the outside of the machine. The cylinder F is composed of a series of rods of a round, oval, or other similar form; and when made oval or semicircular the convex surfaces of each are presented toward the interior of the cylinder, and an opening is left between each rod sufficient to let the air and smut pass outward from the cylinder. The rods are collectively confined at each end in grooved rings, which are braced together by means of rods and screw-nuts on the ends thereof, the rods being passed through lugs projecting from the rings. This cylinder, in a large machine, is composed of several cylinders like the above, placed end to end to obtain the necesssry height, and is closed at the top by a plate, *b*, which rests on the upper grooved ring, and is provided with perforations *c* for the admission of air to the cylinder around the center thereof, and also with segmental openings *d* beyond the grooved ring, to admit currents of air to the fan above, and also with an opening, *e*, to let the grain flow into the cylinder. G is the revolving beater, arranged to revolve within the cylinder on the shaft H, and is constructed with circular head-plates *f*, having curved arms *g*, in order to attach the rods thereto in a curved line, so that the grain, as it falls down on the head of the beater, will be impelled centrifugally thereof against the curved line of the rods, which latter meet and strike the grains of wheat obliquely; and hence the grain will be caused to impinge often on two adjoining rods, ricochetting, as it were, from the first two to a second one, which would not take place were the rods arranged in straight radial lines, thus effectively rubbing or cleaning the smut off the grain.

The object of the head-plate, to describe the matter more clearly, is to receive the grain as it drops thereon from the opening in the top plate of the cylinder, and convey it to the rods; otherwise it would fall from above to the bottom of the shaft without being struck by the rods, the idea being (which has been tested in practice) to carry the grain by centrifugal force to the edge of the plate to be acted on by the rods. The beater is provided with fans *h*, one for each alternate curved arm, which fans consist of plates arranged between the heads around the shaft; and their object, as before stated, is to blow the smut out through the cylinder, and at the same time sweep the grain into the hole *a* of the bottom plate of the cylinder, from whence it flows into the suction-spout through the connecting-spout *i*. The fans also serve as braces to hold the heads firmly together.

I is a conical-shaped case or rim, which rests upon the top plate of the cylinder, and supports the fan-box L, in which is placed the fan M, and which latter is attached to the shaft carrying the beater. The shaft is stepped in the lower part of the machine, where it carries a suitable driving-pulley. The fan-box has an opening centrally above and below, and a spout, *m*, connected therewith for discharging the smut after it is blown out of the cylinder. The sides of the machine are inclosed by the casings N, which form an air-chamber around the cylinder, slits or openings *k* being made in the bottom of the casings for the admission of air into the chamber. The segmental openings in the top plate communicate with the said chamber, so that all the smut blown out of the cylinder is carried up through these openings, and thence discharged through the spout *m* in the fan-box. O is the air-suction spout, extending centrally across the top of the fan-box, and thence downwardly on one side of the machine to near the bottom thereof, where it connects with spout *i* leading from the opening or hole in the bottom plate of the cylinder. The top part of the spout is divided into an upper and lower air-chamber by means of the horizontal division-plate *n*, which terminates in a vertical division-plate, *o*, in the dependent part of the spout, having suitable draft-doors. The upper chamber is divided into two air-chambers, 1 2, by means of a vertical division-plate in the center of the same. The upper chamber 1 is an extension of the air-chamber in the vertical part of the spout. The spout has a branch, O′, having an air-chamber communicating with the air-chamber 1, which latter is closed at the end next to the air-chamber, running vertically in the spout, and may be closed at the opposite end by a valve, *s*. The said branch extends out at right angles from the top part of the suction-spout, and is then carried downwardly as far as the top of the cylinder, or thereabout, at which point, and on the end thereof, is constructed the grain-hopper *u*, having an air-suction entrance, *x*, around it.

The operation of this machine is as follows: The shaft being set in motion, the beaters and fans attached thereto revolve simultaneously with the fan at the top of the machine. Grain is then admitted to the hopper, which passes through the opening in the top plate of the cylinder, and thence descends upon the head of the beater, from whence it is centrifugally impelled therefrom against the rods of the beaters and those of the cylinder, the grain ricochetting, as it were, upon the curved line of rods of the beater; being thus well scoured, it falls on the bottom plate of the cylinder, and is then swept by the fans into the hole of the plate, from whence it descends into the suction-spout, the fans at the same time blowing the smut and dust out through the cylinder into the air-chamber surrounding it, from which it is carried up through the segmental openings in the top plate of the cylinder, and then discharged through the spout *m* out at the top of the machine by the fan M producing an upward current of air in the chamber through the slits or openings in the casings. In the meantime the draft of air up the vertical part of the suction-spout carries up the light grain and screenings, as it issues from the spout *i*, with the good or heavy grain, thence along the horizontal passage or chamber 1, and thence downward past the division-plate, out through the draft-doors in the dependent part of the spout. The air-current continues its course under the board *n*, back through the passage or chamber 2, into the fan-opening, where it and the dust are expelled in the usual manner through the spout *m*.

Having thus fully described my invention, what I claim therein as new, and desire to secure by Letters Patent, is—

1. The revolving beater of a smut-mill, consisting of head-plates provided with curved arms, and rods attached thereto in a curved line, in combination with a cylindrical cleaner inclosing the same, substantially as and for the purpose set forth.

2. The combination of fans with the revolving beater of a smut-mill, constructed as described, and a cylindrical cleaner, substantially as and for the purposes set forth.

In testimony that I claim the foregoing I have hereunto set my hand.

JOHN HINZEY.

Witnesses:
HENRY W. WELLS,
J. M. HINZEY.